Feb. 2, 1960 L. T. GALLETTA ET AL 2,923,425
TRAILER
Filed April 11, 1956 3 Sheets-Sheet 1
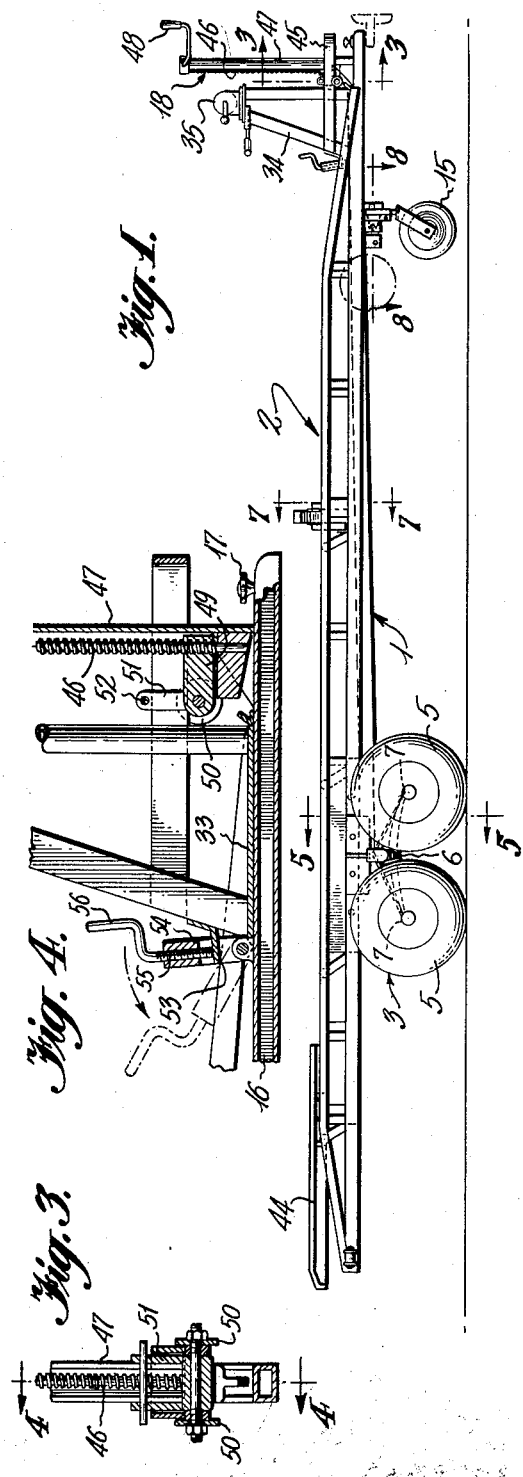
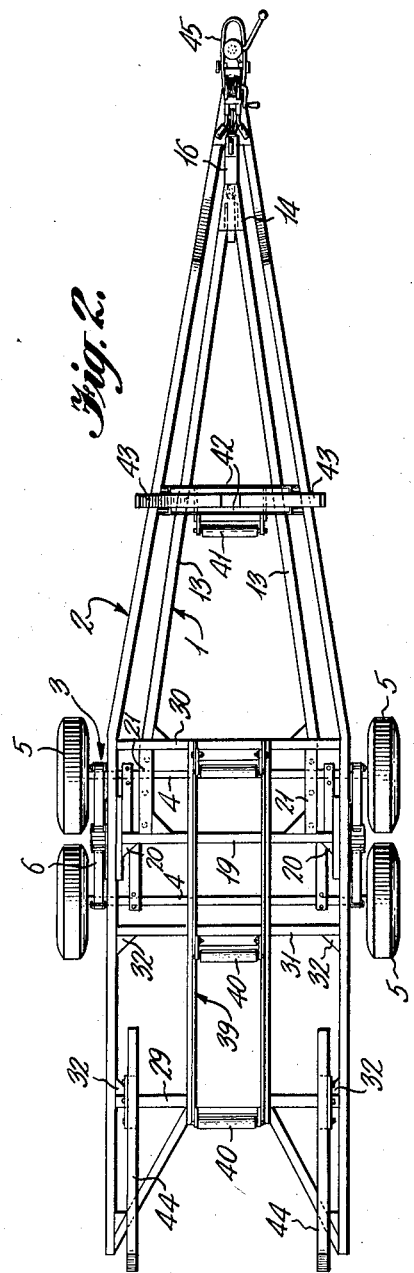
INVENTORS
Leo T. Galletta and
Eugene B. Galletta
BY Mason, Fenwick & Lawrence
ATTORNEYS Feb. 2, 1960
L. T. GALLETTA ET AL
2,923,425
TRAILER
Filed April 11, 1956
3 Sheets-Sheet 2
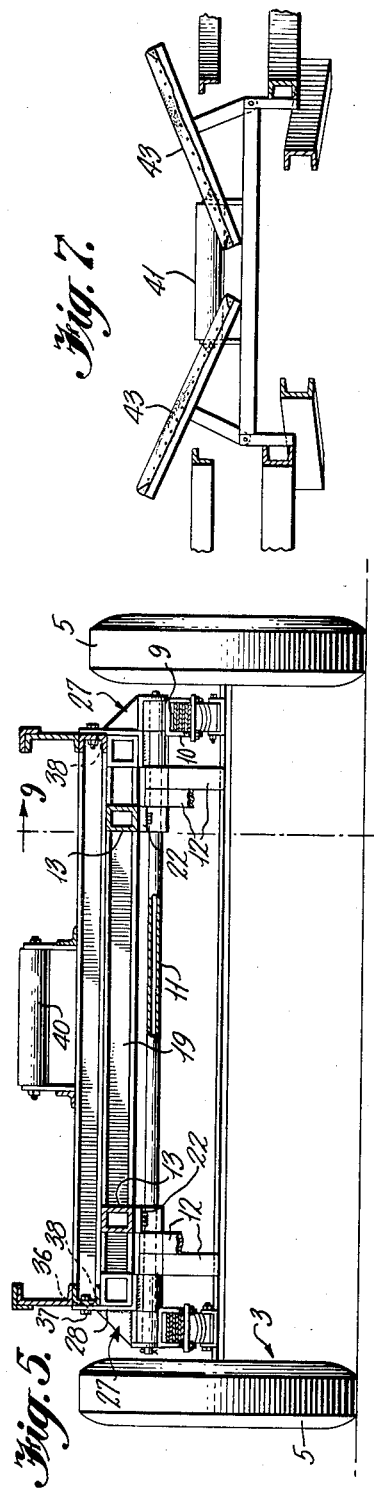
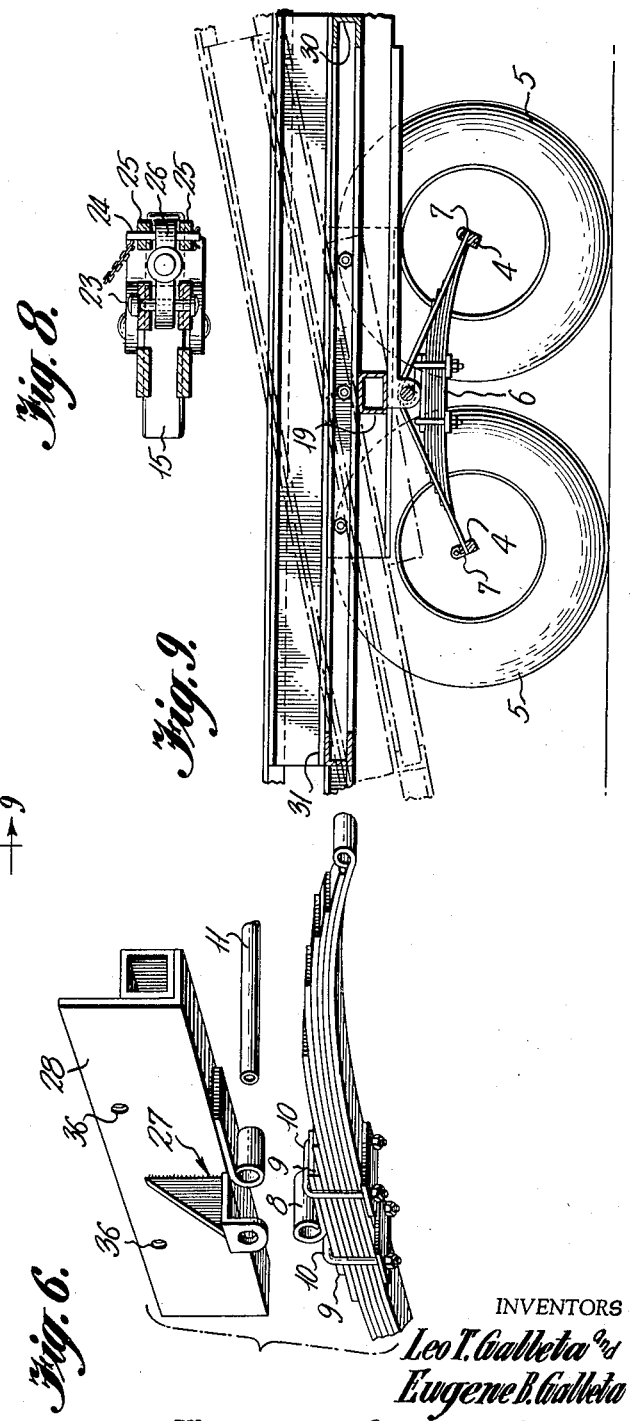
INVENTORS
*Leo T. Galletta and*
*Eugene B. Galletta*
BY *Mason, Fenwick & Lawrence*
ATTORNEYS

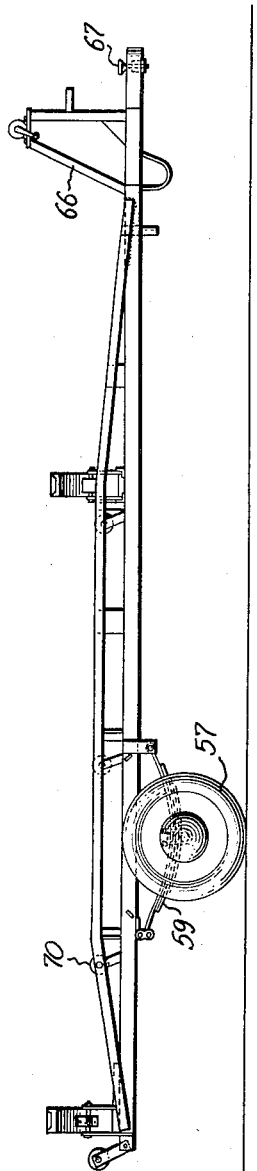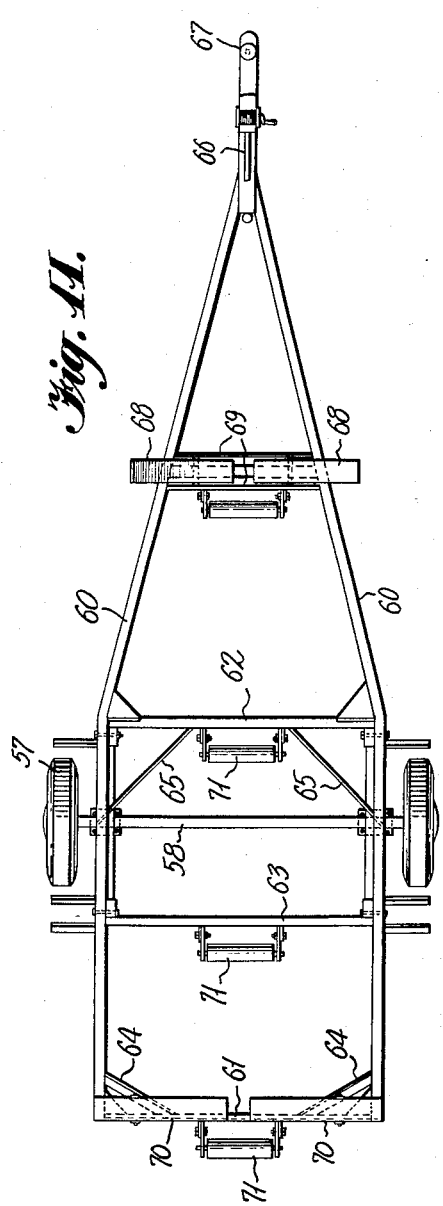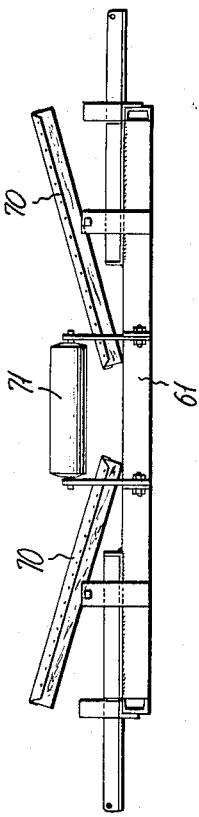

United States Patent Office 2,923,425
Patented Feb. 2, 1960

2,923,425
TRAILER

Leo T. Galletta and Eugene B. Galletta,
Savannah, Ga.

Application April 11, 1956, Serial No. 577,600

2 Claims. (Cl. 214—506)

This invention relates to trailers, and particularly to trailers adapted for use in transporting small boats.

With the increasing popularity of water sports and the perfection of the outboard motor, a demand has arisen for trailers for transporting small boats from homes where they are kept to the waterside. Trailers for the purpose are available, but most have drawbacks to their use from lack of strength or difficulty in loading and unloading the boat.

The object of the present invention is to provide a trailer of great strength having means to simplify the task of loading and unloading a boat.

Another object of the invention is to provide a trailer in which the boat support frame is tiltable relative to the draft frame.

Another object is the provision of a trailer wherein means are provided to adjust the position of the boat supporting frame relative to the draft frame.

A further object is to provide a trailer having a tandem wheel mount which may be shifted longitudinally of the frame in accordance with weight requirements.

Yet another object is to provide a longitudinally tiltable hull support on the boat supporting frame which will change its position as the angle of the boat changes.

Other objects of the invention will become apparent from the following disclosure of two embodiments thereof, when taken in conjunction with the drawings which accompany, and form part of this specification.

In the drawings:

Figure 1 is a side elevation of a boat trailer embodying the principles of the present invention;

Figure 2 is a top plan view thereof;

Figure 3 is a vertical section taken on the line 3—3 of Figure 1, showing in elevation a jack for tilting the boat supporting frame;

Figure 4 is a fragmentary, vertical, longitudinal section through the front end of the trailer;

Figure 5 is a vertical, transverse section, taken on the line 5—5 of Figure 1;

Figure 6 is an exploded perspective view showing the rockshaft connection between the tandem wheel mount and the trailer frame;

Figure 7 is a transverse section taken on the line 7—7 of Figure 1;

Figure 8 is a horizontal section through the dolly wheel mount, and is taken on the line 8—8 of Figure 1;

Figure 9 is an enlarged fragmentary elevation of that wheel mount and adjacent parts of the trailer;

Figure 10 is a side elevation of a modified form of the trailer;

Figure 11 is a top plan view of the trailer shown in Figure 10, and

Figure 12 is a rear elevation of the trailer frame.

Two trailers are shown, and the one shown in Figures 1 to 9 will be described first.

The trailer consists of two frames, a draft frame 1, and a boat supporting frame 2. The draft frame is supported upon a tandem wheel mount 3 as is the boat supporting frame.

The tandem wheel mount comprises a pair of horizontally spaced axles 4, which carry the wheels 5 at their ends. The axles are connected by leaf springs 6 bolted to spring mounts 7 on the axles. Rocker shaft hangers 8 are fixed to the tops of the springs, medially of the springs, by means of rocker plates 9, integral with the hangers, and U-bolts 10. The hangers and springs are outside of, and below, the two frames. A rock shaft 11 is mounted in the hangers 8 and extends transversely of the assembly. Stay bars 12 are pivoted on the rock shaft and have their outer ends connected to the axles. The two frames are mounted on the rock shaft.

The draft frame comprises a tongue of channel side members 13 which converge toward the front of the trailer and are joined at the front by a mounting plate 14 for a dolly wheel 15. A single channel member 16 projects forwardly from the dolly plate and carries a trailer hitch 17 at its forward end. A jack mechanism 18, to be described later in more detail, is also mounted on the forward portion of the tongue channel 16. At the rear, the side members 13 are connected by a cross-brace 19 with suitable gussets 20 at the corners for strengthening purposes. Behind the cross-brace, connecting members 21 project rearwardly parallel to one another. The members 21 are connected to the rock shaft by straps 22 which are pivotally connected to the rock shaft. The members 21 and straps 22 are provided with a plurality of holes to receive fastening bolts. This connection will permit adjustment to vary the length of the tongue. It will be seen that the draft frame will be free to tilt vertically about the rock shaft.

The dolly wheel 15 is pivotally mounted beneath the plate 14 as at 23, so that the dolly can be swung to ground engaging position or raised as desired. A locking pin 24 may be used to pass through brackets 25 on the dolly mount and an ear 26 on the wheel fork to hold the dolly in operative position.

A support bracket 27, mounted on each end of the rock shaft, forms a rotatable mounting for the boat-supporting frame 2. This frame is composed of a pair of truss members 28 which are continuous from one end of the frame to the other. From the forward edge of the tandem assembly rearwardly, the trusses 28 are parallel to one another and are connected near their back ends by cross-brace 29. A second cross-brace 30 extends between the trusses at the forward ends of their parallel portions. A third cross-brace 31 is positioned intermediate the braces 29 and 30. At the junctures of all of the braces with the truss members gussets 32 are provided. From the ends of the trusses diagonal braces extend forwardly to be joined to the cross-brace 29. It will be noted that the portion of the boat-supporting frame between the parallel sections of the trusses has a box-like construction which, with the addition of the triangular sections at the rear, provides an area of unusual rigidity both horizontally and vertically.

At the forward end, the truss members converge to meet at the front. They are joined at the front by a plate 33 which serves as a platform to mount a winch stand 34. The winch stand is rather high so that the winch 35 which it carries will not pull downward on a boat being loaded.

Due to the triangular front and rear sections of the support, the rectangular central sections and the truss side members, the support frame is rigidly held against bending or twisting under load.

The brackets 27 are attached to the frame by means of bolts. The brackets have openings 36 to receive bolts 37 which also pass through openings 38 in the bottom rail of the truss members of the support frame. Additional openings are provided in the truss member so that the brackets can be secured at a number of positions to shift the weight load with respect to the wheels in accordance with the requirements of the boat to be carried.

An auxiliary frame 39 is carried above the support frame upon the cross-braces 29, 30 and 31, upon which are mounted a plurality of horizontally disposed rollers 40 that the boat keel may ride over to reduce friction in loading and launching. A similar roller 41 is mounted on a cross-member 42 near the front of the support platform. Also attached to this cross-member at the ends are transverse cradle blocks 43. These blocks are pivotally attached to be rockable so that they may adjust themselves flatly against a boat hull.

At the rear of the frame, longitudinally extending cradle blocks 44 are pivotally connected to the cross-brace 29. These blocks are spaced apart and tiltable so that they may serve as skids in launching and loading a boat.

Due to its pivotal mounting, the support frame may be tilted to facilitate launching and loading operations. It is essential however that the support frame be held in all positions of adjustment and not be free tilting. To accomplish this, the winch stand 34 is provided with a forward extension 45 to cooperate with the jack 18. The jack is of the screw type, having a vertical jack screw 46 supported in a suitable framework 47, and provided with a crank 48 at the top by which it can be rotated. A jack seat 49 is mounted on the screw and movable therealong when the screw is rotated. As the tilting movement of the boat support frame and winch stand will be arcuate, the extension 45 on the winch stand is in the form of a loop surrounding the jack and rests on rollers 50 mounted at the sides of the jack seat. Vertical brackets 51 from the jack seats extend along the sides of extension 45 and a pin 52 through the brackets engages the top of the extension to lock it between the rollers and the pin. Thus, as the jack is raised or lowered the boat support frame will be tilted about its pivot and held in any desired position of adjustment.

The winch stand is provided with a locking bracket 53 which is engaged by toggle 54 pivotally connected to the draft frame and swingable to overlie the locking bracket. A fastening screw 55 having crank 56 is used to clamp the support frame in horizontal position.

When it is desired to launch a boat, the trailer will be backed down to the water's edge, the toggle released and the jack operated to raise the front end of the boat support platform and lower the back end to the surface of the water. The winch will then be operated to permit the boat to slide down the support on the rollers. A reverse procedure will be used for loading.

In the modification shown in Figures 10 to 12, the draft and support frames are a single unit. In this form only two wheels 57 are used, mounted on an axle 58, suspended by springs 59 from the frame.

The frame is composed of side members 60 of truss form which extend the full length of the trailer. In the rearward section of the trailer the side members are parallel and connected by a rear cross-member 61, a forward cross-member 62 and an intermediate cross-member 63. Braces 64 and 65 extend angularly across the corners to add rigidity to the rear rectangular portion of the frame. From the brace 62 forward, the side members converge to meet at the front, forming a triangular section which serves to brace the rectangular rear section. A winch stand 66 and a trailer hitch 67 are mounted at the front end.

Here, again, as in the first form of the invention, the rectangular and triangular frame sections are utilized to brace one another in a horizontal plane, and the side frames are in the form of trusses to prevent vertical distortions. This combination of elements and their particular arrangement provide a frame of great rigidity.

Forward cradle blocks 68 are pivotally mounted on a transverse brace 69 extending between the converging portions of the side members. Additional cradle blocks 70 are mounted at the rear on the cross-brace 61. Each of the cross-members will have mounted upon it a roller 71 upon which the boat may roll in loading or launching.

While in the above two practical embodiments of the invention have been disclosed, it will be understood that the precise details of structure described and shown are merely by way of example and the invention may take other forms within the scope of the appended claims.

What is claimed is:

1. In a boat trailer, a wheeled draft frame, a boat supporting frame pivotally mounted intermediate its length to said draft frame, said boat supporting frame having a pair of side members of truss formation extending the lengths thereof, said boat supporting frame having a rectangular medial section in which the side members are parallel and connected by cross-members, rear sections in which the side members are parallel and have their ends connected to the rearmost cross-member of the medial rectangular section to form two triangular sections to brace and stiffen the medial section in a horizontal plane, and a forward section in which the side members converge to meet at the front to form an additional triangular section to further stiffen the rectangular medial section, means to move said boat supporting frame about its pivot, cradle blocks longitudinally positioned and pivotally mounted on transverse pivots at the rear of said boat supporting frame to support the stern of a hull and serve as skids in loading and launching the boat.

2. In a boat trailer as claimed in claim 1, said wheeled draft frame comprising a frame, a rock shaft carried by said frame and forming the pivotal connection between the draft and boat supporting frames, pairs of stay bars having their ends pivotally mounted on the rock shaft with the stay bars of opposing pairs extending in opposite directions from the rock shaft and having their free ends attached to a pair of spaced wheel axles, and an upwardly convex leaf spring attached at its center to the rock shaft and having its free ends in contact with the wheel axles.

References Cited in the file of this patent

UNITED STATES PATENTS

| | | |
|---|---|---|
| 1,913,698 | Clement | June 13, 1933 |
| 2,506,699 | Byrd | May 9, 1950 |
| 2,589,678 | DeLay | Mar. 18, 1952 |
| 2,676,716 | Sallis | Apr. 27, 1954 |
| 2,708,045 | Shontz | May 10, 1955 |
| 2,711,259 | Jones | June 21, 1955 |
| 2,717,707 | Martin | Sept. 13, 1955 |
| 2,733,823 | Evans | Feb. 7, 1956 |
| 2,788,146 | Gronlund | Apr. 9, 1957 |